(12) United States Patent
Wang et al.

(10) Patent No.: US 8,774,526 B2
(45) Date of Patent: Jul. 8, 2014

(54) INTELLIGENT IMAGE SEARCH RESULTS SUMMARIZATION AND BROWSING

(75) Inventors: Jingdong Wang, Beijing (CN); Xian-Sheng Hua, Beijing (CN)

(73) Assignee: Microsoft Corporation, Redmond, WA (US)

( * ) Notice: Subject to any disclaimer, the term of this patent is extended or adjusted under 35 U.S.C. 154(b) by 656 days.

(21) Appl. No.: 12/701,969

(22) Filed: Feb. 8, 2010

(65) Prior Publication Data

US 2011/0194761 A1 Aug. 11, 2011

(51) Int. Cl.
*G06K 9/62* (2006.01)
*G06K 9/68* (2006.01)
*G06T 17/05* (2011.01)
*G06K 9/00* (2006.01)

(52) U.S. Cl.
CPC . *G06T 17/05* (2013.01); *G06K 9/62* (2013.01); *G06K 9/00476* (2013.01); *G06K 9/00617* (2013.01); *G06K 9/00456* (2013.01); *G06K 9/00536* (2013.01)
USPC ............ 382/209; 382/217; 382/219; 382/220

(58) Field of Classification Search
CPC ............... G06T 17/05; G06K 9/00476; G06K 9/00456; G06K 9/00536; G06K 9/62; G06K 9/00617; G06F 17/15; G06F 17/30241
USPC ......... 382/103, 115–118, 159, 165, 170, 209, 382/217–220, 224–228
See application file for complete search history.

(56) References Cited

U.S. PATENT DOCUMENTS

| 7,660,468 | B2 * | 2/2010 | Gokturk et al. | 382/224 |
|---|---|---|---|---|
| 7,680,343 | B2 * | 3/2010 | Covell et al. | 382/224 |
| 7,725,451 | B2 | 5/2010 | Jing et al. | |
| 7,797,271 | B1 * | 9/2010 | Bonneau et al. | 705/343 |
| 2006/0015497 | A1 | 1/2006 | Keating et al. | |
| 2007/0271297 | A1 | 11/2007 | Jaffe et al. | |
| 2008/0219564 | A1 * | 9/2008 | Covell et al. | 382/224 |
| 2009/0262977 | A1 * | 10/2009 | Huang et al. | 382/103 |
| 2009/0313239 | A1 | 12/2009 | Wen et al. | |
| 2010/0066822 | A1 * | 3/2010 | Steinberg et al. | 348/77 |

OTHER PUBLICATIONS

Cai, et al., "Hierarchical Clustering of WWW Image Search Results Using Visual, Textual and Link Information", retrieved on May 26, 2010 at <<http://citeseerx.ist.psu.edu/viewdoc/download?doi=10.1.1.72.455&rep=rep1&type=pdf>>, ACM, Proceedings of International Conference on Multimedia (MM), New York, NY, Oct. 2004, pp. 952-959.

(Continued)

*Primary Examiner* — Brian Le
(74) *Attorney, Agent, or Firm* — Carole Boelitz; Micky Minhas; Lee & Hayes PLLC

(57) ABSTRACT

Techniques for intelligent image search results summarization and browsing scheme are described. Images having visual attributes are evaluated for similarities based in part on their visual attributes. At least one preference score indicating a probability of an image to be selected into a summary is calculated for each image. Images are selected based on the similarity of the selected images to the other images and the preference scores of the selected images. A summary of the plurality of images is generated including the selected one individual image.

20 Claims, 9 Drawing Sheets

(56) References Cited

OTHER PUBLICATIONS

Chang, et al., "LIBSVM: a Library for Support Vector Machines", retrieved on May 26, 2010 at <<http://citeseerx.ist.psu.edu/viewdoc/download?doi=10.1.1.66.2871&rep=rep1&type=pdf>>, National Taiwan University, Technical Report, 2001-2007, pp. 1-26. (Software available at http://www.csie.ntu.edu.tw/~cjlin/libsvm).

Frey, et al., "Clustering by Passing Messages Between Data Points", retrieved on May 26, 2010 at <<http://www.google.co.in/url?sa=t&source=web&ct=res&cd=1&ved=0CBcQFjAA&url=http%3A%2F%2Fciteseerx.ist.psu.edu%2Fviewdoc%2Fdownload%3Fdoi%3D10.1.1.121.3145%26rep%3Drep1%26type%3Dpdf&rct=j&q=Clustering+by+Passing+MessagesBetween+Data+Points&ei=RVP-S8LLJ46xrAetocz4Dg&usg=AFQjCNFfdmjwZMMSHrsBstDCP-eX64ycjw>>, AAAS, SCIENCE Magazine, vol. 315, Feb. 16, 2007, pp. 972-976.

Gao, et al., "Web Image Clustering by Consistent Utilization of Visual Features and Surrounding Texts", retrieved on May 26, 2010 at <<http://tsintao.googlepages.com/qin-mm05.pdf>>, ACM, Proceedings of International Conference on Multimedia (MM), Singapore, Nov. 2005, pp. 112-121.

Jia, et al., "Finding Image Exemplars Using Fast Sparse Affinity Propogation", retrieved on Dec. 30, 2008 at <<http://delivery.acm.org/10.1145/1460000/1459448/p639-jia.pdf?key1=1459448&key2=6654980321&coll=GUIDE&dl=GUIDE&CFID=16934217&CFTOKEN=19327438>>, ACM, Proceedings of International Conference on Multimedia (MM), Vancouver, CA, Oct. 2008, pp. 639-642.

Jing, et al., "IGroup: Web Image Search Results Clustering", retrieved on May 26, 2010 at <<http://research.microsoft.com/en-us/um/people/leizhang/paper/acmmm06_igroup.pdf>>, ACM, Proceedings of International Conference on Multimedia (MM), Santa Barbara, CA, Oct. 2006, pp. 377-384.

Kennedy, et al., "Generating Diverse and Representative Image Search Results for Landmarks", retrieved on May 26, 2010 at <<http://www.google.co.in/url?sa=t&source=web&ct=res&cd=6&ved=0CB8QFjAF&url=http%3A%2F%2Fciteseerx.ist.psu.edu%2Fviewdoc%2Fdownload%3Fdoi%3D10.1.1.119.1522%26rep%3Drep1%26type%3Dpdf&rct=j&q=generating+web+image+cluster&ei=A0irS6LUMtO6jAeJofjWDw&usg=AFQjCNEFwCBRBWDdZIkpXuFUcIS1-n601g>>, ACM, Proceedings of.

Liu, et al., "Effective Browsing of Web Image Search Results", received on May 26, 2010 at <<http://citeseerx.ist.psu.edu/viewdoc/download?doi=10.1.1.93.8744&rep=rep1&type=pdf, ACM, Proceedings of International Workshop on Multimedia Information Retrieval (MIR), New York, NY, Oct. 2004, pp. 84-90.

Moellic, et al., "Image Clustering Based on a Shared Nearest Neighbors Approach for Tagged Collections", retrieved on May 26, 2010 at <<http://perso-etis.ensea.fr/~jeanhaug/pagePerso/files/pdf/haugeard08civr.pdf>>, ACM, Proceedings of International Conference on Content-based Image and Video Retrieval (CIVR), Niagara Falls, CA, Jul. 2008, pp. 269-278.

Simon, et al., "Scene Summarization for Online Image Collections", retrieved on May 26, 2010 at <<http://citeseerx.ist.psu.edu/viewdoc/download?doi=10.1.1.79.4888&rep=rep1&type=pdf>>, IEEE Proceedings of International Conference on Computer Vision (ICCV), 2007, pp. 1-8.

Song, et al., "Diversifying the Image Retrieval Results", retrieved on May 26, 2010 at <<http://citeseerx.ist.psu.edu/viewdoc/download?doi=10.1.1.88.1226&rep=rep1&type=pdf>>, ACM, Proceedings of International Conference on Multimedia (MM), Santa Barbara, CA, Oct. 2006, pp. 707-710.

Tenenbaum, et al., "A Global Geometric Framework for Nonlinear Dimensionality Reduction", retrieved on May 26, 2010 at <<http://citeseerx.ist.psu.edu/viewdoc/download?doi=10.1.1.110.6050&rep=rep1&type=pdf>>, AAAS, SCIENCE Magazine, vol. 290, Dec. 22, 2000, pp. 2319-2323.

van Leuken, et al., "Visual Diversification of Image Search Results", retrieved on May 26, 2010 at <<http://www2009.org/proceedings/pdf/p341.pdf>>, ACM, Proceedings of International Conference on World Wide Web (WWW), Madrid, ES, Apr. 2009, pp. 341-350.

van Zwol, et al., "Diversifying Image Search with User Generated Content", retrieved on May 26, 2010 at <<http://research.yahoo.com/files/ACMMIR2008.pdf>>, ACM, Proceedings of International Conference on Multimedia Information Retrieval (MIR), Vancouver, CA, Oct. 2008, pp. 67-74.

Wang, et al., "Grouping Web Image Search Result", retrieved on May 26, 2010 at <<portal.acm.org/citation.cfm?id=1027632>>, ACM, Proceedings of International Conference on Multimedia (MM), New York, NY, Oct. 2004, pp. 436-439.

Weinberger, et al., "Resolving Tag Ambiguity", retrieved on May 26, 2010 at <<http://research.yahoo.com/files/ctfp6043-weinberger.pdf>>, ACM, Proceeding of International Conference on Multimedia (MM), Vancouver, CA, Oct. 2008, pp. 111-120.

Zhang, et al., "Improving Web Search Results Using Affinity Graph", retrieved on May 26, 2010 at <<http://citeseerx.ist.psu.edu/viewdoc/download;jsessionid=4A90A6465AA34B6B9940AD294C88537E?doi=10.1.1.111.8016&rep=rep1&type=pdf>>, ACM, Proceedings of International SIGIR Conference on Research and Development in Information Retrieval, Salvador, BR, Aug. 2005, pp. 504-511.

Zhu, et al., "Improving Diversity in Ranking using Absorbing Random Walks", retrieved on May 26, 2010 at <<http://pages.cs.wisc.edu/~jerryzhu/pub/grasshopper.pdf>>, Human Language Technologies: The Annual Conference of the North American Chapter of the Association for Computational Linguistics (NAACL-HLT), Rochester, NY, 2007, pp. 1-8.

\* cited by examiner

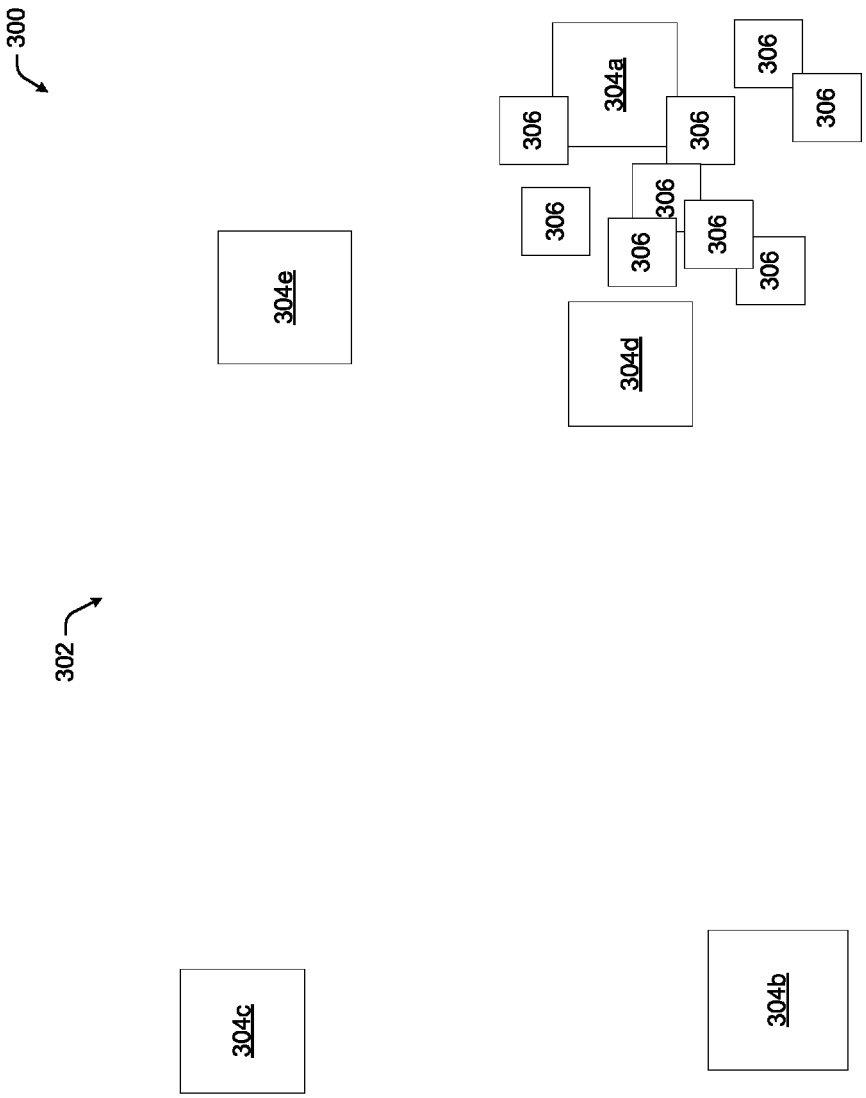

INTELLIGENT IMAGE SEARCH RESULTS SUMMARIZATION AND BROWSING

BACKGROUND

Most existing commercial image search engines use text associated with images as the basis to retrieve images based on the assumption that the associated text of images, including tags, captions and surrounding text, are usually relevant to the image content. This may lead to unsatisfactory visual results due to a lack of consideration for the visual aspects of the images since the results rely solely on the associated text of the images.

Since the visual perception of human beings for images is different from the perception for text, a gap exists between a user's intention and the text-query based searching techniques. This disparity leads to inconvenience and inefficiency for the user since she has to browse through a significant number of images obtained from the textual-based search query to locate a desired image.

Currently there is a lack of an intuitive overview of image search results. For example, if the user would like to get a quick overview of returned images, she has to either click through several pages, each bearing numerous images, or drag through a scroll bar to look through all the images. Moreover, even after the user has viewed all the images, it is still not easy for the user to effectively get a sense of the distinctive types of image embodied within a large number of images returned based on the textual-based search query.

SUMMARY

Exemplary systems and methods for intelligent image search results summarization and browsing are presented. In one implementation, a system evaluates the visual similarities between images based on the visual attributes of the images and calculates preference scores for each of the images. The preference scores may be used to indicate a probability of an image to be selected into a summary of the images. Images are selected for inclusion in the summary based on their respective similarities with the other images and their respective preference scores.

In another implementation, a system can be employed to display the selected images concurrently with the other images based on the strength of similarity between the selected images and the other images. In yet another implementation, a system can activate an image and generate a local detailed map of the active image comprising a large scale view of the active image and other images similar to the active image. In another implementation, a system can generate a browsing path of the similar images to the active image.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

BRIEF DESCRIPTION OF THE DRAWINGS

The Detailed Description is set forth with reference to the accompanying figures. The teachings are described with reference to the accompanying figures. In the figures, the leftmost digit(s) of a reference number identifies the figure in which the reference number first appears. The use of the same reference numbers in different figures indicates similar or identical items.

FIGS. 3A-3B are exemplary screen renderings that illustrate a user interface that enables a user to interact with a forest representation or global visualization and a detailed image map, in accordance with various embodiments of intelligent image summarization

DETAILED DESCRIPTION

Exemplary Scheme

Figure 1:
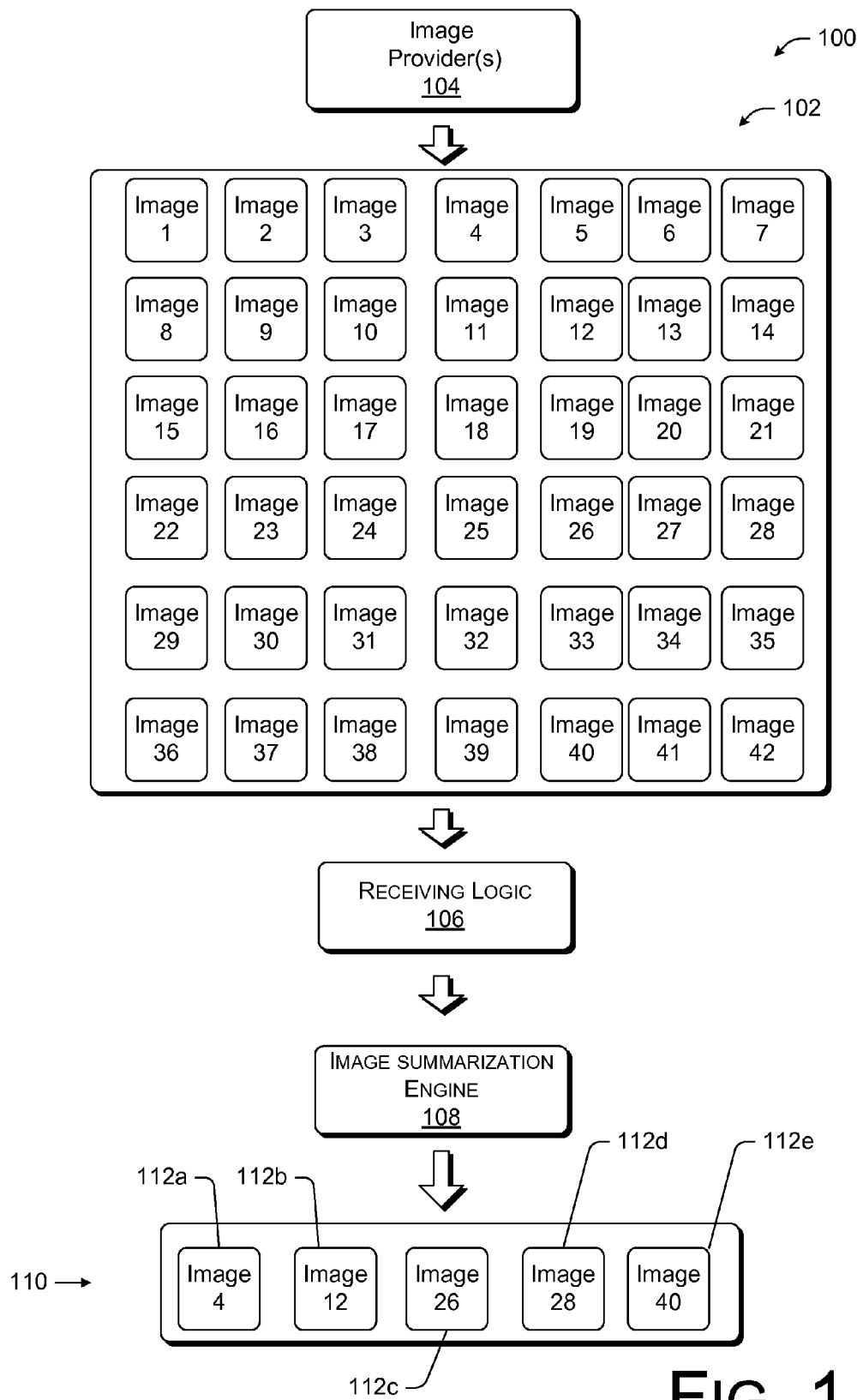
FIG. 1 is a simplified block diagram that illustrates an exemplary intelligent image summarization process, in accordance with various embodiments.

FIG. 1 shows an exemplary intelligent image summarization system 100. The intelligent image summarization system 100 may receive a plurality of images 102 from one or more image providers 104. The image providers 104 may include any source that possesses images. The images 102 are generally images in electronic format, such as, but not limited to, photographic images, still images from video clips, and the like. For example, but not as a limitation, the images 102 may be RGB images. The images 102 may also be stored in a variety of formats, such as, but not limited to, JPEG, TIFF, RAW, and the like.

In the exemplary system 100, the images 102 may be transferred to a receiving logic 106. The receiving logic 106 receives the images 102 via one or more networks and transfers the images 102 to an image summarization engine 108. The one or more networks may include wide-area networks (WANs), local area networks (LANs), or other network architectures. However, in other embodiments, at least one of the images 102 may reside within a memory of the image summarization engine 108. Accordingly, in these embodiments, the image summarization engine 108 may access at least one of the images 102 without using the one or more networks.

The image summarization engine 108 is generally configured to evaluate the similarities of the images 102 and calculate preference scores to indicate the probability of one of the images 102 to be selected to a summary 110 of the images. In various embodiments, the summary 110 is a grouping of selected images that represent the content of an overall set of images. According to various embodiments, the image summarization engine 108 may select an image 112a, 112b, 112c, 112d, 112e from the plurality of images 102. The selected image 112a, 112b, 112c, 112d, 112e is included in the summary 110 of images. In the example shown in FIG. 1, five images, 112a, 112b, 112c, 112d, 112e are selected as representative images of the plurality of images 102. In various embodiments, images 112a, 112b, 112c, 112d, 112e may each represent a different characteristic of the plurality of images 102 possessed by one or more of the images 102, represent the highest visual quality among the plurality of images 102 and represent a high degree of relevance to a search query.

Exemplary Components

Figure 2:
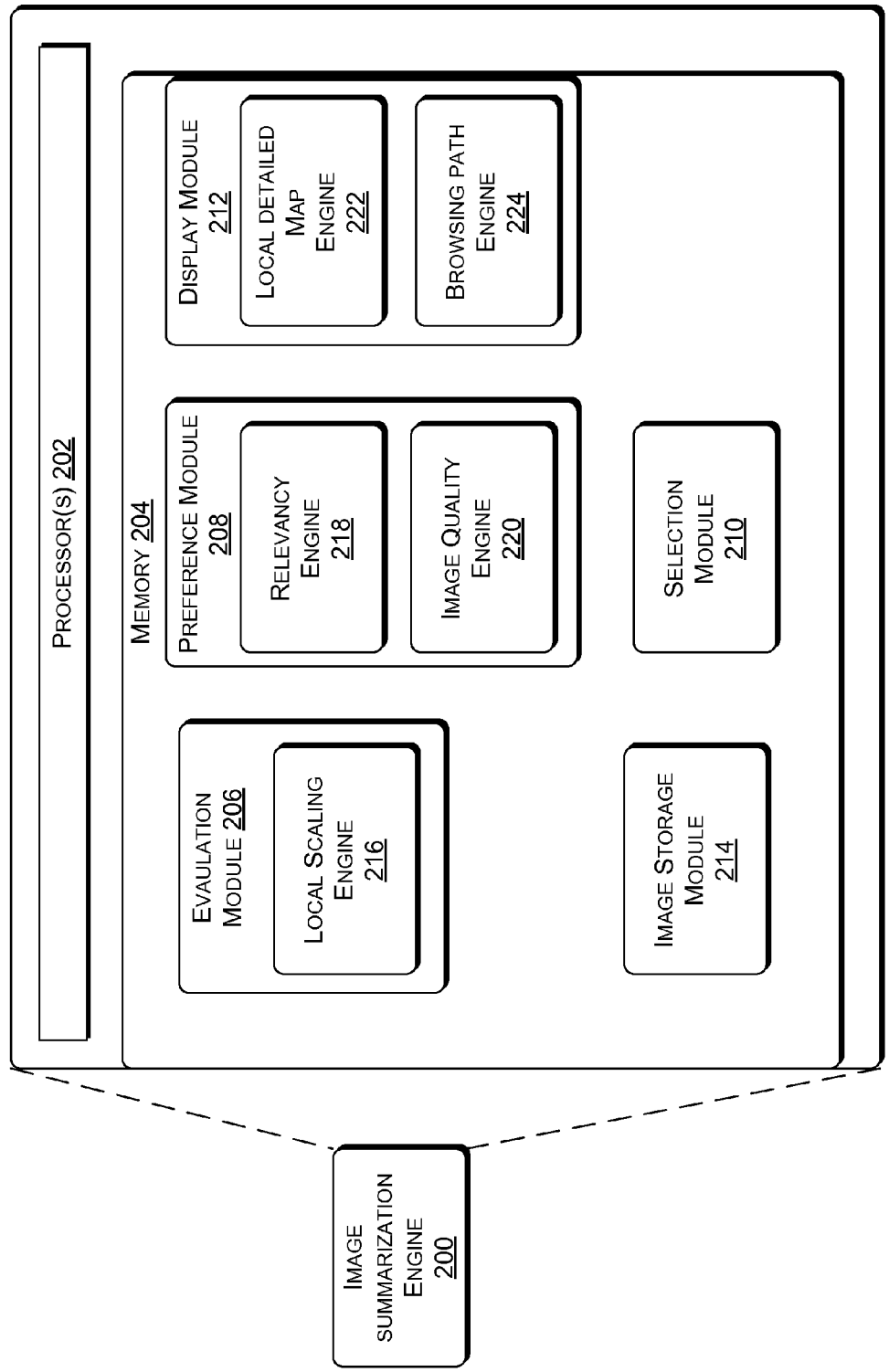
FIG. 2 is a simplified block diagram that illustrates selected components of an intelligent image summarization engine, in accordance with various embodiments.

FIG. 2 illustrates selected components of one example of the image summarization engine 200. In various embodiments, the image summarization engine 200 may receive images from the receiving logic 106, previously discussed in FIG. 1. The image summarization engine 200 may include one or more processors 202 and memory 204. The memory 204 may store program instructions. The program instructions, or modules, may include routines, programs, objects, components, and data structures that perform particular tasks or implement particular abstract data types. The memory 204 may include volatile and/or nonvolatile memory, removable and/or non-removable media implemented in any method or technology for storage of information, such as computer-readable instructions, data instructions, program modules, or other data. Such memory may include, but is not limited to, random accessory memory (RAM), read-only memory (ROM), electrically erasable programmable read-only memory (EE-PROM), flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information is accessible by a computer system.

In various embodiments, the image summarization engine 200 may include an evaluation module 206, a preference module 208, a selection module 210, a display module 212, and a data storage module 214.

In some embodiments, the evaluation module 206 evaluates the visual similarities of the images 102 to each other. The evaluation module may measure the similarities of several types of features from the images 102.

In various embodiments, the preference module 208 receives the images from the evaluation module 206 and calculates preference scores for each of the images 102. The preference scores may indicate a measure of probability for each of the images 102 to be selected into summary 110 of images.

In various embodiments, the selection module 210 receives the images 102 along with their respective evaluated similarities and preference scores and selects images 112a, 112b, 112c, 112d, 112e based on the similarity of the selected images 112a, 112b, 112c, 112d, 112e to others in the plurality of images 102 and the preference scores. The selection module 210 further generates the summary 110 of images including the selected images 112a, 112b, 112c, 112d, 112e.

In some embodiments, the display module 212 receives the summary 110 of selected images 112a, 112b, 112c, 112d, 112e and displays the summary 110 to the user.

In various embodiments, an image storage module 214 stores images 102 in the image summarization engine 200. The image storage module 214 may provide images 102 to the evaluation module 206. In some embodiments, the image storage module 214 obtains images 102 from databases or other sources of images by way of one or more networks, computer media or by way of an input device (i.e. cameras, mobile devices, etc.).

Evaluation Module

In the exemplary embodiment of the image summarization engine 200 shown in FIG. 2, the evaluation module 206 may include a local scaling engine 216. In various embodiments, the local scaling engine 216 may implement various techniques to evaluate the similarities between images 102 based on various visual attributes. In various embodiments, the visual attributes may correspond to the color, shape or texture of the images 102. In various embodiments, the local scaling engine 216 may implement a "local scaling parameter" technique for evaluating the similarities between the images 102 as further detailed below.

Local Scaling Parameter

The local scaling parameter technique introduced above may use a local scaling parameter to evaluate the visual similarities of the images 102. In the described example, a local scaling parameter is calculated for each image. Then, the local scaling parameters are compared to one another. Images having similar local scaling factors may be considered to possess similar visual attributes.

Visual similarity can be evaluated using the Gaussian function as in Equation 1:

$$s(x_i, x_j) = \exp\left(-\frac{\|x_i - x_j\|2}{2\sigma^2}\right), \quad (1)$$

Where $\sigma$ is the scaling parameter to adjust a similarity degree, s, and $x_i$ and $x_j$ are two data points. However, there may not be a single value that works well for all the data when the input data includes clusters with different local statistics. A local scaling approach may address the foregoing. Rather than using a global scaling parameter, an estimate is made for each data point using its local scaling parameter according to its distance vis-à-vis the other data points. Specifically, the square of distances of a data point to the others may be calculated, to compute the square root of the harmonic mean as its local scale parameter. Harmonic mean may be adopted because it tends strongly toward the least elements of the distances and also tends (compared to the arithmetic mean) to mitigate the impact of large outliers and aggravate the impact of small ones.

Mathematically, the local scaling parameter is calculated using Equation 2, as follows:

$$\sigma_i^2 = \frac{n-1}{\sum_{k \neq i} \frac{1}{\max(\epsilon, d^2(x_i, x_k))}}. \quad (2)$$

Where $\epsilon = 0.00001$ is a constant to avoid the divisor that may be too small, $\sigma$ is a scaling parameter to adjust the similarity degree, n represents the number of images, d is a distance between data points $x_i$ and $x_j$ from images. Then the similarities with local scaling between two data points is defined using Equation 3, as follows:

$$s(x_i, x_j) = \exp\left(-\frac{\|x_i - x_j\|2}{2\sigma_i \sigma_j}\right). \quad (3)$$

In various embodiments, the visual attributes used for determining similarities include the color, shape and texture of the images. For each of the images, calculations for each of these features may be made, with the results multiplied together to get the overall similarity of these features. Then an overall affinity matrix may be obtained with the local scaled similarities $A = [\alpha_{ij}]_{n \times n}$ with each entry $\alpha_{ij} = (x_i, x_j)$, and n being the image number.

The local scaling parameter provides a high quality similarity comparison since the local scaling parameter is able to capture different scales of data clusters possessed in different images.

It will be appreciated that while some of the evaluation techniques implemented by the local scaling engine 216 have been discussed, the local scaling engine 216 may employ other techniques to compare the similarity of images 102 based on shared visual attributes. Accordingly, the above discussed evaluation techniques are examples rather than limitations.

Preference Scoring

In the exemplary embodiment of the image summarization engine 200 shown in FIG. 2, the preference module 208 may receive the images 102 from the evaluation module 206. In various embodiments, the preference module 208 generates preference scores for the images 102. The images 112a, 112b, 112c, 112d, 112e in the summary 110 serve as an overview of the image search results and may possess high preference scores in comparison to the other images not selected for the summary 110. Hence, for the summary 110 to be a good representation, the selected images 112a, 112b, 112c, 112d, 112e may be relevant, and also look visually satisfactory. As such, two preference measurements may achieve the foregoing: a relevance preference score and an image quality preference score. In various embodiments, the preference scores ensure that the most relevant and high quality images are included in the summary.

In various embodiments, the preference module 208 may include a relevancy engine 218 and an image quality engine 220. The relevancy engine 218 may provide a relevancy score to each of the images 102 based on the respective sequence order of the images 102 in the plurality of images 102 as further detailed below. The image quality engine 220 may provide an image quality score for each of the images 102 based on the visual quality of the images 102 as further detailed below.

Relevancy Preference

Given the number of images from an image search result, obtaining the exact degree of relevance for any one of the provided images with respect to the query is difficult because existing search engines only use the text information associated with the images to return the results of the query. However, the sequence order in which an image is placed in the search results in a large sense usually reflects the degree of relevance of that particular image. Accordingly, it is reasonable to use the original sequence order of an image as a measure of relevancy.

In various embodiments, for one image in position i, its relevancy score $r_i$ may be obtained as a Gaussian distribution, $$r_i = \exp\left(-\frac{i^2}{2\sigma_r^2}\right),$$

where $\sigma^2=200$ is a parameter to determine how many top ordered images are given higher preference. The whole relevance preference over n images may be denoted as a vector $r=[r_1 \ldots r_n]^T$.

Image Quality Preference

In various embodiments, the preference module 208 may further include an image quality engine 220. As previously mentioned, the image quality engine 220 may provide an image quality score for each of the images 102 based on the visual quality of the images 102. Furthermore, in some embodiments, the visual quality may be determined on the basis of the following parameters: color entropy, brightness, blur, block, dynamic range, intensity contrast, image width or image height.

In another embodiment, the image quality engine 220 may utilize a support vector machine. For example, a set of sample web images may be selected and labeled manually based on the image quality for each of the set of sample web images. The labeled images may be divided according to their quality score into three levels: (1) the best; (2) middle; and (3) the worst. The images belonging to the best level may be employed as the positive samples, while the images belonging to the worst level may be employed as negative samples. The images in the middle level are viewed as ambiguous samples, and may be discarded in the training process.

In various embodiments, 8-dimensional features from the labeled images, corresponding to color entropy, brightness, blur, block, dynamic range, intensity contrast, image width and image height may be featured in the training process. In various embodiments, these 8-dimensional features may then be used to train a support vector machine (SVM) classifier. A soft SVM classifier using well known probability estimate techniques such that the range is between 0 and 1, with 1 corresponding to high quality and 0 corresponding to low quality. Then, for each image, its image quality score may be denoted by $q_i$. The whole quality score is denoted as a quality vector $q=[q_1 \ldots q_n]^T$. Then, the relevance score and image quality score is combined together to get a whole preference $p=\alpha r+(1-\alpha)q$ with $\alpha=0.5$. To make p be a distribution, p is normalized so that $\Sigma_i p_i = 1$.

In the exemplary embodiment of the image summarization engine 200 shown in FIG. 2, the selection module 210 may receive the images 102 from the preference module 208 along with their respective evaluated similarities and preference scores and thereafter, selects and generates the summary 110 of images including the selected images 112a, 112b, 112c, 112d, 112e.

In various embodiments, the selection module 210 selects images 112a, 112b, 112c, 112d, 112e based on the similarity of the selected images 112a, 112b, 112c, 112d, 112e to the other images 102 and the preference scores of the selected images 112a, 112b, 112c, 112d, 112e. In various embodiments, the selection module 210 generates a summary 110 of images including the selected images 112a, 112b, 112c, 112d, 112e.

A high quality summary of image collections may possess the following properties: (1) the images in the summary are representative of a local group in the image collection, i.e., it is similar to many other items (centralization); (2) the representative images cover as many distinct groups as possible (diversity); and (3) the summary incorporates an arbitrary preference as prior knowledge (preference).

In various embodiments, the selection module 210 may improve the diversity of images provided in the summary through a dynamic absorbing random walk algorithm as further detailed below.

Absorbing Random Walk

Absorbing random walk is an algorithm that may improve the diversity of the images selected for the summary 110. In various embodiments, the absorbing random walk may be applied by the selection module 210.

In some embodiments, absorbing random walk may be applied to encourage diversity as follows. A random walk is defined on a graph over the items. The item with the largest stationary probability is selected and pushed into a list. Once an item has been selected, it is set to be in an absorbing state. Absorbing states drag down the stationary probabilities of the items close to them, thus encouraging diversity. Mathematically, this process is described as follows:

A transition matrix $\tilde{T}=[\tilde{t}_{ij}]_{n\times n}$ is defined by normalizing the rows of $$A: \tilde{t}_{ij} = \frac{a_{ij}}{\sum_{k=1}^{n} a_{ik}},$$

so that $\tilde{t}_{ij}$ is the probability that walker moves to j from i. Then a teleporting random walk T is obtained by interpolating each row with the preference p as provided in Equation 4.

$$T=\lambda\tilde{T}+(1-\lambda)ep^T, \quad (4)$$

where e is an all-1 vector, and $ep^T$ is the outer product. When $\lambda<1$ and p does not have zero elements, this teleporting random walk T is irreducible, aperiodic, and all states are positive recurrent and thus ergodic. Therefore, T has a unique stationary distribution $\pi=T^T\pi$.

In one example, a group of items $G=\{g_i\}$ has been selected, the group of items can be turned into absorbing states by setting $p_{gg}=1$ and $p_{gi}=0$, $\forall i\neq g$.

The items can be arranged so that the selected items are listed before the remaining items. The transition matrix T is thus rewritten as Equation 5:

$$T_G = \begin{pmatrix} I_G & 0 \\ R & Q \end{pmatrix}. \quad (5)$$

The state with the largest expected number of visits is then selected into G in current iteration. The average expected visit number is calculated as Equation 6:

$$v = \frac{N^T e}{n - |G|}, \quad (6)$$

where |G| is the size of G, and N is a so-called fundamental matrix as provided in Equation 7:

$$N=(I-Q)^{-1}. \quad (7)$$

Based on the foregoing, a dynamic weight tuning scheme based on the absorbing random walk may improve the diversity performance for visual summarization.

Dynamic Absorbing Random Walk

As previously mentioned, the absorbing random walk approach can improve the diversity in ranking, but the improvement is significantly limited when the data points distribute in such a way that the image number in different groups are not balanced.

It is not likely that all the groups are with similar image numbers in a real world setting. The stationary distribution for different iterations of absorbing random walk can be affected by the close proximity of data points for a group of images. Typically, images from a group containing such close data points may dominate a summary. This is because the group contains too many points which are close to each other, so that the influence of a few absorbing states is too weak to lower the stationary probabilities of other points in this group.

In order to address the foregoing and, thereby obtain a diverse summary for visual summarization, a dynamic absorbing random walk is provided, which, in addition to producing absorbing states, dynamically updates the transition matrix according to the present selected items, described as the dynamic weight tuning scheme.

The transition probability is dynamically adjusted between two remaining terms according to their similarities to the selected items. Intuitively, if two items are very similar to the selected images the similarity, is reduced between them and in turn their transition probability is also reduced, which will consequently reduce the probability that they are selected as the representative images in the summary. Formally, the transition is tuned as in Equation 8, as follows:

$$\tilde{t}_{jk}^{|G|} = \begin{cases} \dfrac{t_{jk}^{|G-1|}}{\exp(\rho \times t_{ji}^0 \times t_{ki}^0)}, & i \neq j, i \neq k \\ t_{jk}^{|G-1|}, & \text{otherwise} \end{cases} \quad (8)$$

Where i is the index of the item selected in the |G−1|-th iteration, $t_{ji}^0$ and $t_{ki}^0$ are the initial transition probabilities from items j and k to item i, and $\rho=2$ is a parameter which controls the degree of the adjustment of the transition probabilities. Each row is normalized in $\tilde{T}^{|G|}$ to obtain a transition matrix $T^{|G|}$. Then the sub transition matrix over the remaining images is denoted as $Q^{|G|}$. Similar to the absorbing random walk, the expected number of visits of the remaining images can be calculated, and the item with the maximum expected number of visits can be selected.

The following algorithm provides the computation of a diversified visual summary via dynamic absorbing random walk:

1. Compute the stationary distribution $\pi^1$ of the random walk T, so that $\pi^1 = T^T \pi^1$.
2. Push i to visual summary S, with $i=\arg\max_{j=1}^n \pi_j^1$.
3. Set image i to be an absorbing state.
4. Update the transition matrix $T^{\tau-1}$ to $T^\tau$ according to Equation 8.
5. Calculate the average visiting number according to Equation 6.
6. Push i into S with $i=\arg\max_j v_j$.
7. Repeat step 3 to step 6 until the number of images in S reaches a preset number.

It will be appreciated that while some of the techniques implemented by the selection module 210 have been discussed, the selection module 210 may employ other techniques to select images for the summary. Accordingly, the above discussed techniques to select images are examples rather than limitations.

Display

In the exemplary embodiment of the image summarization engine 200 in FIG. 2, the display module 212 may receive the selected images 112a, 112b, 112c, 112d, 112e from the selection module 210. In various embodiments, the display module 212 receives the generated summary 110 of images, including the plurality of images 102 and the selected images 112a, 112b, 112c, 112d, 112e from the selection module 210. In various embodiments, the selected images 112a, 112b, 112c, 112d, 112e may be displayed to the user in an organized manner. In various embodiments, the display module 212 may display the selected images 112a, 112b, 112c, 112d, 112e concurrently with the plurality of images 102 based on a function of strength of similarity between the visual attributes of the selected images 112a, 112b, 112c, 112d, 112e and the visual attributes associated with the plurality of images 102.

In some embodiments, displaying the selected images 112a, 112b, 112c, 112d, 112e concurrently with the plurality of images 102 based on a function of strength of similarity between the visual attributes of the selected images 112a, 112b, 112c, 112d, 112e and the visual attributes associated with the plurality of images 102 may be accomplished by hierarchical summarization by recursively categorizing remaining images from the plurality of images 102 into a category which corresponds to the most similar selected images 112a, 112b, 112c, 112d, 112e as detailed further below.

In various embodiments, the display module 212 may include a local detailed map engine 222. The local detailed map engine 222 can generate a local detailed map of an active image as detailed further below.

In various embodiments, the display module 212 may include a browsing path engine 224. The browsing path engine 224 may generate a browsing path of the similar other images to the active image as detailed further below.

Interactive Browsing

In various embodiments, to utilize the summarization for browsing image search results, the remaining images may be categorized by selecting each remaining image into the category that corresponds to the most similar image in the summary 110. To allow users to intuitively browse each category of images, the visual summarization is further performed for each category of images. This process may be recursively performed until the number of images in each category is smaller than some predetermined number. This process is called hierarchical summarization. With hierarchical summarization, image collections are represented by a visual forest.

Figure 3A:
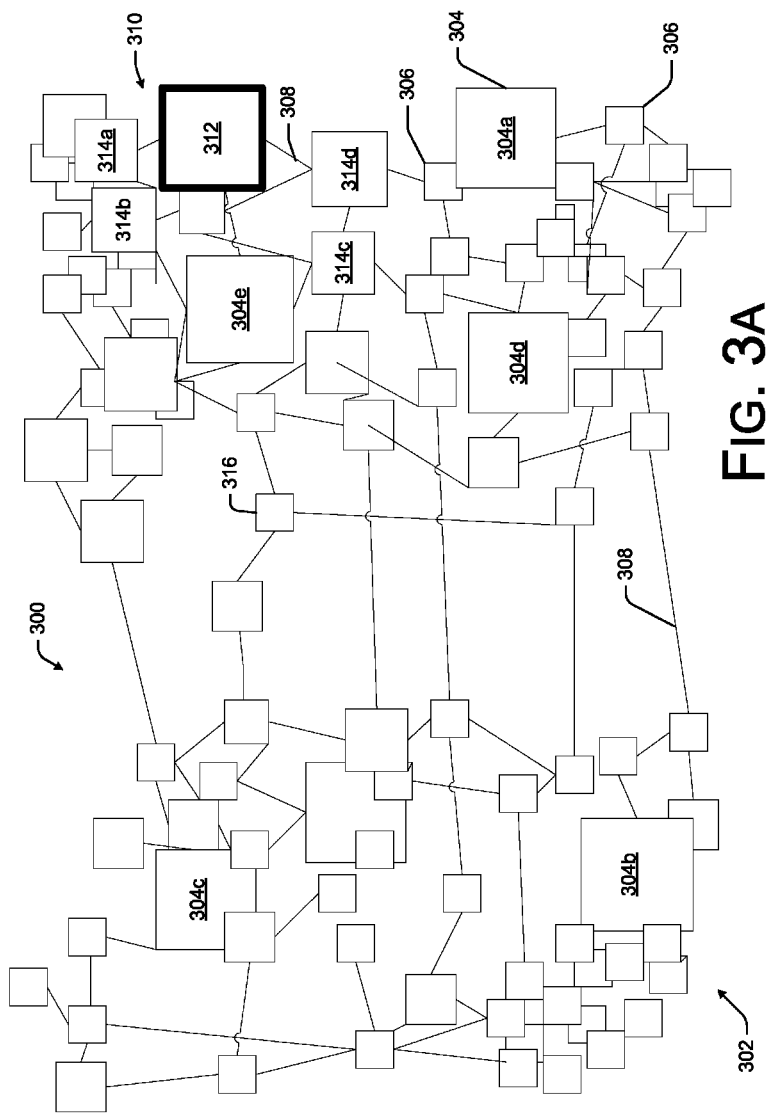

FIGS. 3A-3B illustrate an exemplary screen rendering of a forest representation or global visualization 300 of the hierarchical summarization of images previously mentioned. Images 102 are depicted as blocks arranged in the forest representation 300 as a function of their degree of similarity to one another. In various embodiments, the images 102 may be arranged as a function of strength of similarity between their respective visual attributes. In various embodiments, respective dimensions of images 102 correspond to the generated preference scores as previously detailed. For example, larger images may possess greater preference scores and thus likely correspond to selected images 112a, 112b, 112c, 112d, 112e in the summary 110. In various embodiments, the forest representation 300 provides a well organized view of image collections 302. In various embodiments, the image collections correspond to groups of images 102 sharing visual similarities and categorized with respect to the selected images 112a, 112b, 112c, 112d, 112e. The forest representation 300 may allow users to easily get a whole overview of the image search results, i.e., a visual summary of the image collections 302 and conveniently present the image details, including their relationship to one another, automatically according to the user's interest.

FIG. 3B illustrates an exemplary nested list view employed to browse the forest representation 300. At the beginning, only root images 304a, 304b, 304c, 304d, 304e of the trees in the forest representation 300 are displayed, which provides a quick overview of the image collections 302. In various embodiments, the root images correspond to the selected images 112a, 112b, 112c, 112d, 112e displayed in the summary 110. In an exemplary embodiment, a user selects image 304a and other images closely related images 306 to the selected image 304a are automatically displayed concurrently with the selected image 304a. A user may recursively click an image to explore the trees to find images of interest.

FIG. 3A illustrates an exemplary graph based interactive scheme of the forest representation 300 to enable users to easily browse a forest representation 300. In various embodiments, a graph based interactive scheme may include various path lengths 308 illustrating the relationships between images making up the forest 300. The graph based interactive browsing scheme is a unified way to combine similarity-based global visualization 300 and a local detailed map 310, as further detailed below, which enable users to visualize the overall similarity relation of all the images, and at the same time, to get the detail view of interested images.

As previously mentioned, the forest representation or global visualization 300 may assist the user in navigating the image collections 302. In order to obtain the global visualization 300, the image space may be embedded into a 2-dimensional (2D) space, such that the visually similar images are embedded neighborly and visually dissimilar images are placed far away. In various embodiments, the nonlinear dimensionality reduction algorithm, isometric feature mapping (ISOMAP) may be adopted to embed high dimensional images into a 2D space because ISOMAP is capable of preserving the geodesic distance in the 2D space.

Moreover, the ISOMAP calculates the distance according to the local Euclidean distance. Specifically, the ISOMAP algorithm may be as follows. First, a weighted K-nearest neighbor graph is constructed, with the weight being the corresponding Euclidean distance. Second, a geodesic distance matrix $D_g$ is defined over the images as the sum of edge weights along the shortest path between two nodes, computed using the Dijkstra's algorithm. Third, an inner product matrix is obtained by Equation 9, as:

$$K = -\tfrac{1}{2} H D_g^{\,2} H, \tag{9}$$

Where $D_g^{\,2}$ means the element-wise square of the geodesic distance matrix $D_g$, and H is a centering matrix with $$h_{ij} = \delta_{i=j} - 1/n. \tag{10}$$

Finally, the two eigenvectors $\alpha_1$ and $\alpha_2$ corresponding to the two maximum eigenvalues $\lambda_1$ and $\lambda_2$ of K are used to form the 2D embedding. The 2D coordinate of image i is calculated as $y_i = [\sqrt{\lambda_1}^i \alpha_1, \sqrt{\lambda_2}^i \alpha_2]^T$.

Since this global 2D embedding will be combined with the local detailed map 310, 2D embedding may be recorded in the hierarchical tree structure using the relative coordinates rather than the original absolute coordinates. Specifically, for each image, a relative coordinate $\bar{y}$ is computed by assuming its parent image to be at the origin. Since the root images 304a, 304b, 304c, 304d, 304e of the trees in the forest 300 have no parent, its relative coordinate is calculated by subtracting their mean coordinate, $\bar{y}_i = y_i - 1/k \Sigma_{j=1}^{k} y_j$.

FIG. 3A illustrates an exemplary embodiment of an inhomogenous image scale scheme to show the local detailed map 310. In some embodiments, an active image 312 is displayed in a larger level and its children images 314a, 314b, 314c, 314d are also in a larger scale while non-detailed images 316 are displayed on a smaller level with its associated relative coordinates. Technically, this scheme consists of two issues: detailed image determination and the scaling scheme.

In an exemplary embodiment, the detailed image determination is according to the user's interactivity with the image collections 302. Initially, a dummy root node is introduced to unify the forest 300 as a tree, and this dummy node is viewed as an active image. In various embodiments, during the interactivity process, the image selected by the user may be the active image 312 and may be the focus of the local detailed map 310.

With respect to a scaling scheme, the basic idea is to inspect the minimum path length 308 between each child image 314a, 314b, 314c, 314d and the active image 312 in the tree structure to scale and position the images. In some embodiments, this may be accomplished by denoting the path length 308 of one image $I_i$ from the detailed image by $I_i$, and an indicator variable $b_i$ to show whether the image is a successor or an ancestor of the active image 312.

Specifically, the displaying level for image i is calculated as $z_i=0.1\times(10-2\times I_i)$ when $I_i<3$ if the image is a successor of the current active image, $s_i=0.1\times(10-2\times I_i)$ when $I_i<2$ if the image is an ancestor of the current active image 312, and $s_i=0.15$ for other images. This displaying adjustment may highlight the active image 312 and the images 314a, 314b, 314c, 314d related with it in the visual forest organization 300. For the relative coordinate of image i, we compute a scale as $s_i=-a\exp(-I_i)+b$ so that the scale is guaranteed to be between $b-a$ and $b$. Furthermore $a=15$ and $b=20$ for the detailed images and $a=5$ and $b=5$ for the non-detailed images, which helps highlight the detailed images. Then the coordinates of each image are computed as $\tilde{y}_i=\tilde{y}_{pi}+s_i\times\bar{y}_i$.

In various embodiments, this relative distance adjustment will enable the local detailed map 310 to be displayed in a broader area. Finally, all the coordinated are transformed so that it fits the display view size.

Browsing Path View

Figure 4A:
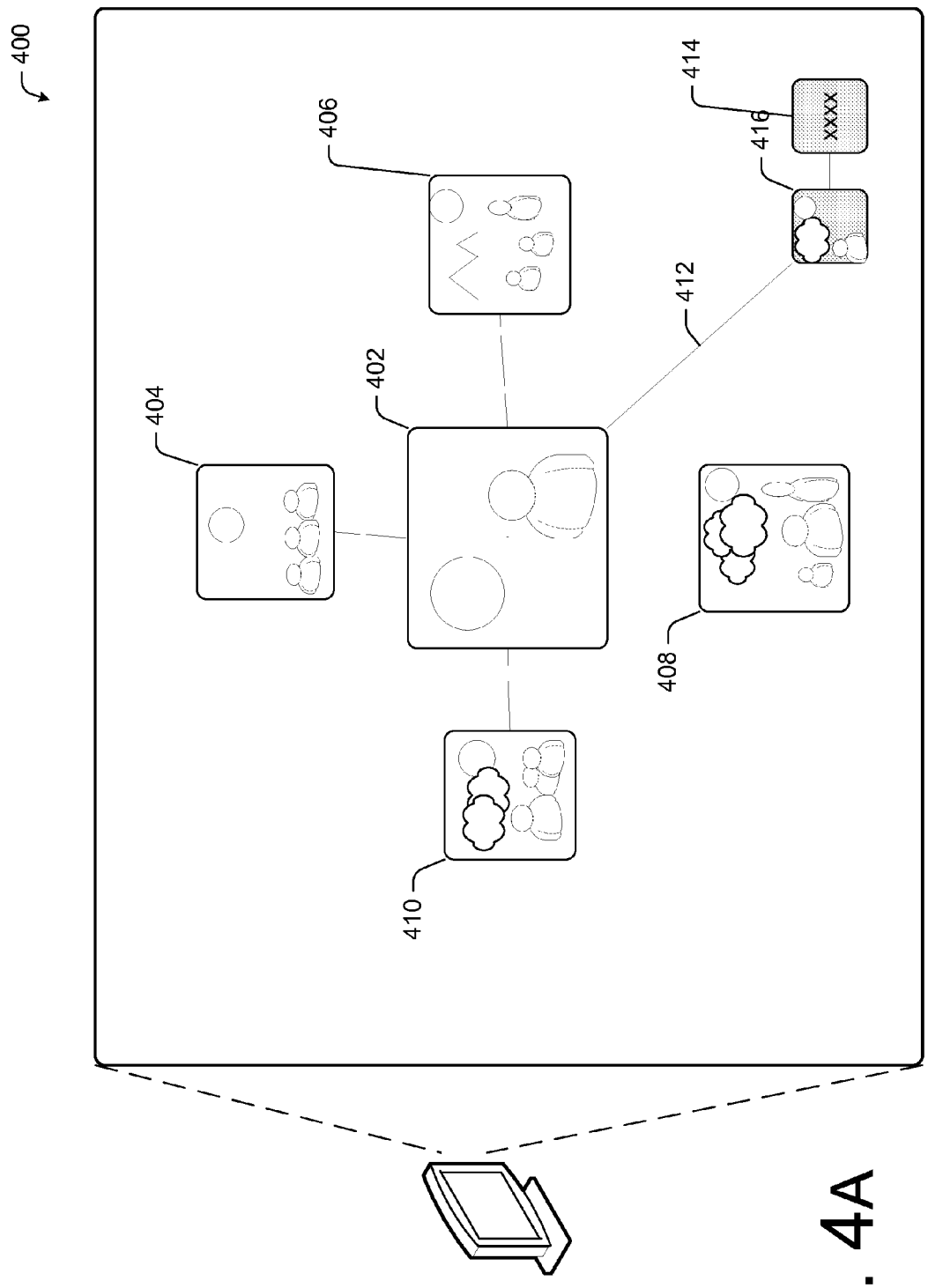
FIGS. 4A-4B are exemplary screen renderings that illustrate a user interface that enables a user to interact with a browsing path, in accordance with various embodiments of intelligent image summarization.
Figure 4B:
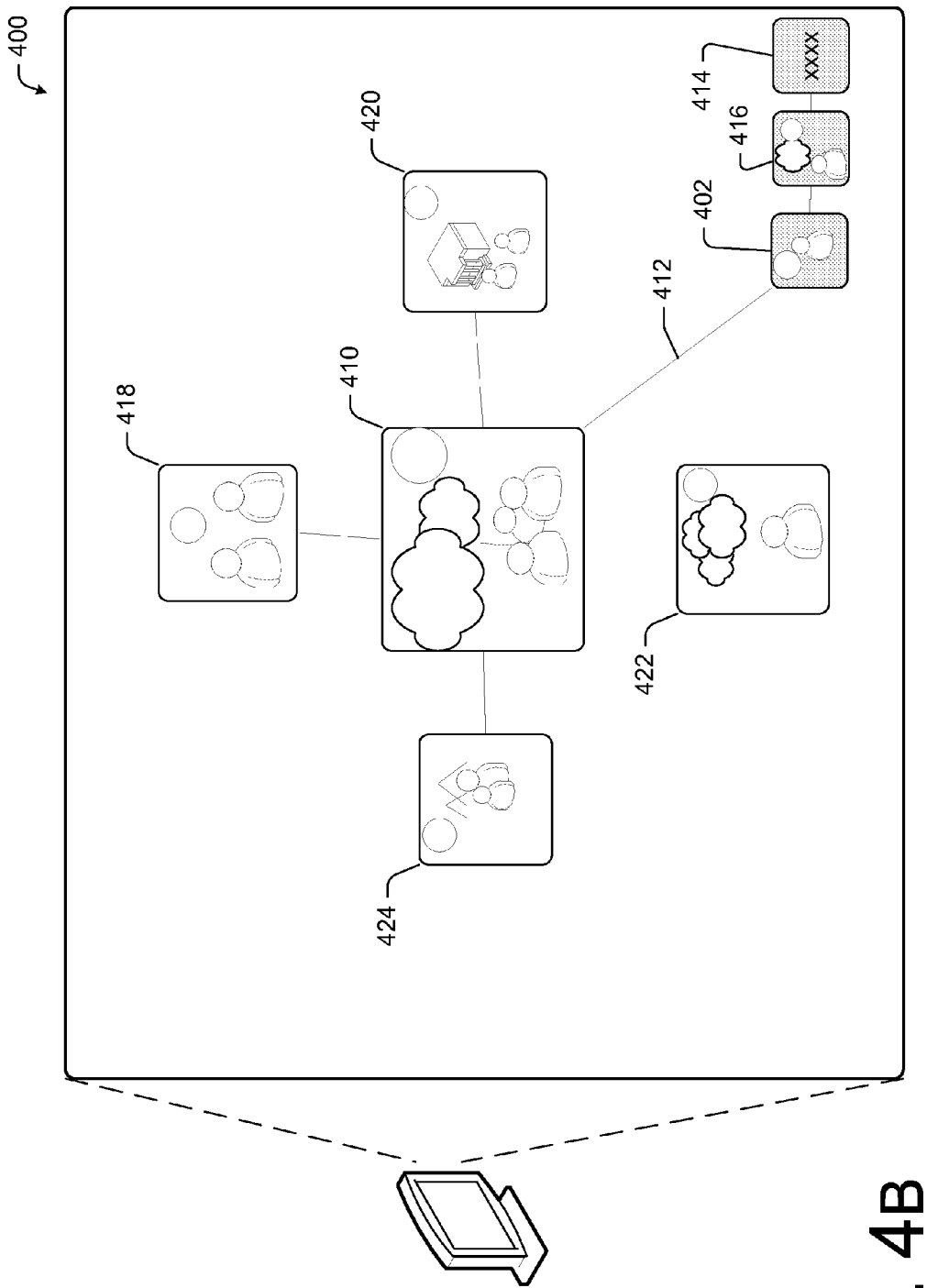

FIGS. 4A-4B illustrate an exemplary browsing path view 400 to navigate the intelligent visual summarization. The browsing path view 400 may allow users to easily keep track of her browsing history through the images as well as provide relationships of select images. For example, while browsing the images 102, the user may wish to recall a previously viewed image but may find it difficult to locate it again in when presented with numerous other similar images. The browsing path view 400 may provide an efficient means to locate the previously viewed image since it may be easily accessible with minimal disruption to the user's navigation.

FIG. 4A illustrates an exemplary browsing path view 400. In various embodiments, the focus of the browsing path view 400 is the selected image 402, i.e., the image which is clicked. The browsing path view 400 displays three types of images: the selected image 402, its children images 404, 406, 408, 410 and the path 412 from the selected image 402 to a text root 414. In various embodiments, the text root 414 can include an initial text query supplied to initiate the image search results. In various embodiments, the path 412 may further include previously viewed images 416.

As illustrated in FIGS. 4A and 4B, in some embodiments, the browsing path view 400 also presents a simple browsing scheme when clicking an image as the selected image. There can be three actions according to the clicked image type. In some embodiments, when clicking an image child 410, the following actions may take place. As shown in FIG. 4A, the selected child image's parent 402 is pushed into the path 412, and the path 412 is updated to display the selected child image's parent 402 in sequence with the previously viewed image 416 and the root text 414. Then, as illustrated in FIG. 4B, the selected child image 410 is displayed in the center, and the selected child image's 410 own child images 418, 420, 422, 424 are displayed with the selected child image 410.

Conversely, in various embodiments, when clicking an image in the path 412, the selected image 402 and its children 404, 406, 408, 410 are removed from the path 412. As illustrated in FIG. 4A, the active image 402 is displayed in the center, and its children 404, 406, 408, 410 are displayed around the active image 402. Thus, the browsing path view 400 allows the user to back-browse or otherwise navigate through the image search results. In some embodiments, during browsing, users may switch the local detailed map 310 with the browsing path view 400 and vice versa since the local detailed map 310 and the browsing path view 400 can be synchronized by using the same selected image.

Illustrative Overview Process

Figure 5:
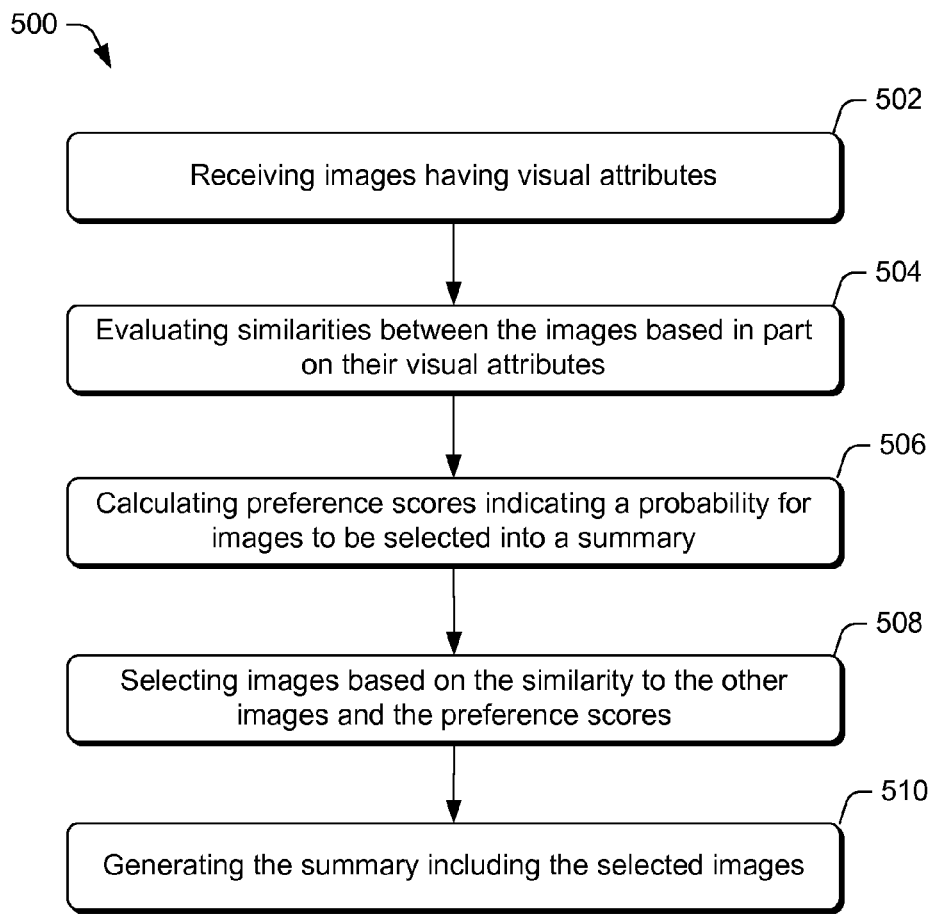
FIG. 5 is a flow diagram illustrating an exemplary process for intelligent image summarization, in accordance with various embodiments.
Figure 6:
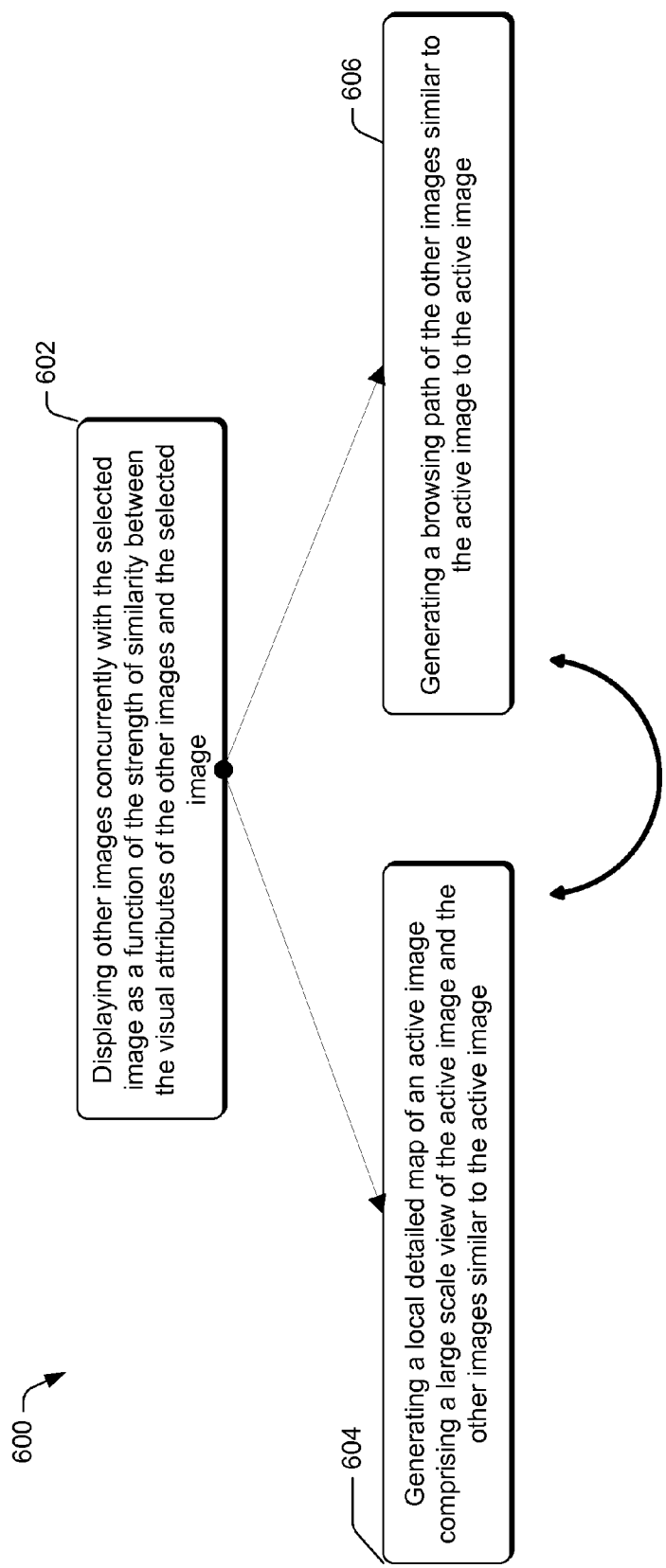
FIG. 6 is a flow diagram illustrating an exemplary process for generating a local detailed map and a browsing path, in accordance with various embodiments.

FIGS. 5-6 illustrate exemplary processes that facilitate intelligent image summarization and browsing. The exemplary processes in FIGS. 5-6 are illustrated as a collection of blocks in a logical flow diagram, which represents a sequence of operations that can be implemented in hardware, software, and a combination thereof. In the context of software, the blocks represent computer-executable instructions, that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to the exemplary image summarization engine 108 of FIG. 1, although they may be implemented in other system architectures.

FIG. 5 is a flow diagram illustrating an exemplary process 500 for intelligent image summarization, in accordance with various embodiments.

At block 502, a plurality of images is received. Each of the images in the plurality of images has at least one visual attribute. For example, the visual attribute may correspond to color, shape or texture. Moreover, the plurality of images may include image results based on a textual query.

At block 504, similarities between the images based in part on the visual attributes are evaluated. For instance, several images from the plurality of images may share similarities in color, shape or texture. In one embodiment, when evaluating the similarities between the images a local scaling parameter may be applied. The local scaling parameter may provide the ability to capture the different scales of data clusters contained in the images.

At block 506, preference scores are calculated for each of the images. In various embodiments, the preference scores may indicate a probability for each of the images to be selected into a summary. In various embodiments, the preference scores may comprise a relevancy score and an image quality score. The relevancy score may be based on the sequence order of the images in the plurality of images. For example, the sequence order in a sense reflects the relevance degree and thereby it is reasonable to use the original order as the relevance preference. The image quality score may be based on the visual quality of the images. For example, the visual quality may be determined using color entropy, brightness, blur, block dynamic range, intensity contrast, image width or image height. In another instance, these eight dimensional features may be used to train a support vector machine classifier.

At block 508, at least one image is selected based on the similarity of the selected image to the other images and the preference score of the selected image. In various embodiments, the selecting may be based on dynamic absorbing walk in order to increase diversity of images selected in the summary. For example, when data points distribute in such a way that the image number in different groups of images are not balanced, the dynamic absorbing walk provides, in addition to producing absorbing states, dynamic updates to a transition matrix according to selected items, described as the dynamic weight tuning scheme.

At block 510, a summary is generated of the plurality of images including the selected images.

FIG. 6 is a flow diagram illustrating an exemplary process 600 for intelligent image summarization and browsing the summary, in accordance with various embodiments.

At block 602, the other images of the plurality of images are displayed concurrently with the selected image. For example, the display of the other images is varied as a function of strength of similarity between the visual attributes associated with the other images and the selected images. For example, visually similar images are displayed closer to each other than visually dissimilar images. In various embodiments, the display may comprise of a forest representation which provides an entire overview of the plurality of images organized based on the similarity of the images between each other.

At block 604, a local detailed map of an active image is generated wherein the local detailed map comprises a large scale view of the active image and the other images similar to the active image. In some embodiments, the display may be organized based on isometric feature mapping. For example, in order to embed high-dimensional images into a two-dimensional space, isometric feature mapping may be used since the nonlinear dimensionality reduction algorithm of the isometric feature mapping preserves the geodesic distance in the high dimensional space when embedding into the two-dimensional space.

At block 606, a browsing path view is generated of closely similar images to the active image. In some embodiments, the browsing path view further comprises at least one child image and at least one text root. For example, the child image is directly related to the active image based on the similarities between their respective visual attributes. In another example, the text root may correspond to the original initial text query supplied to initiate the image search results.

Figure 7:
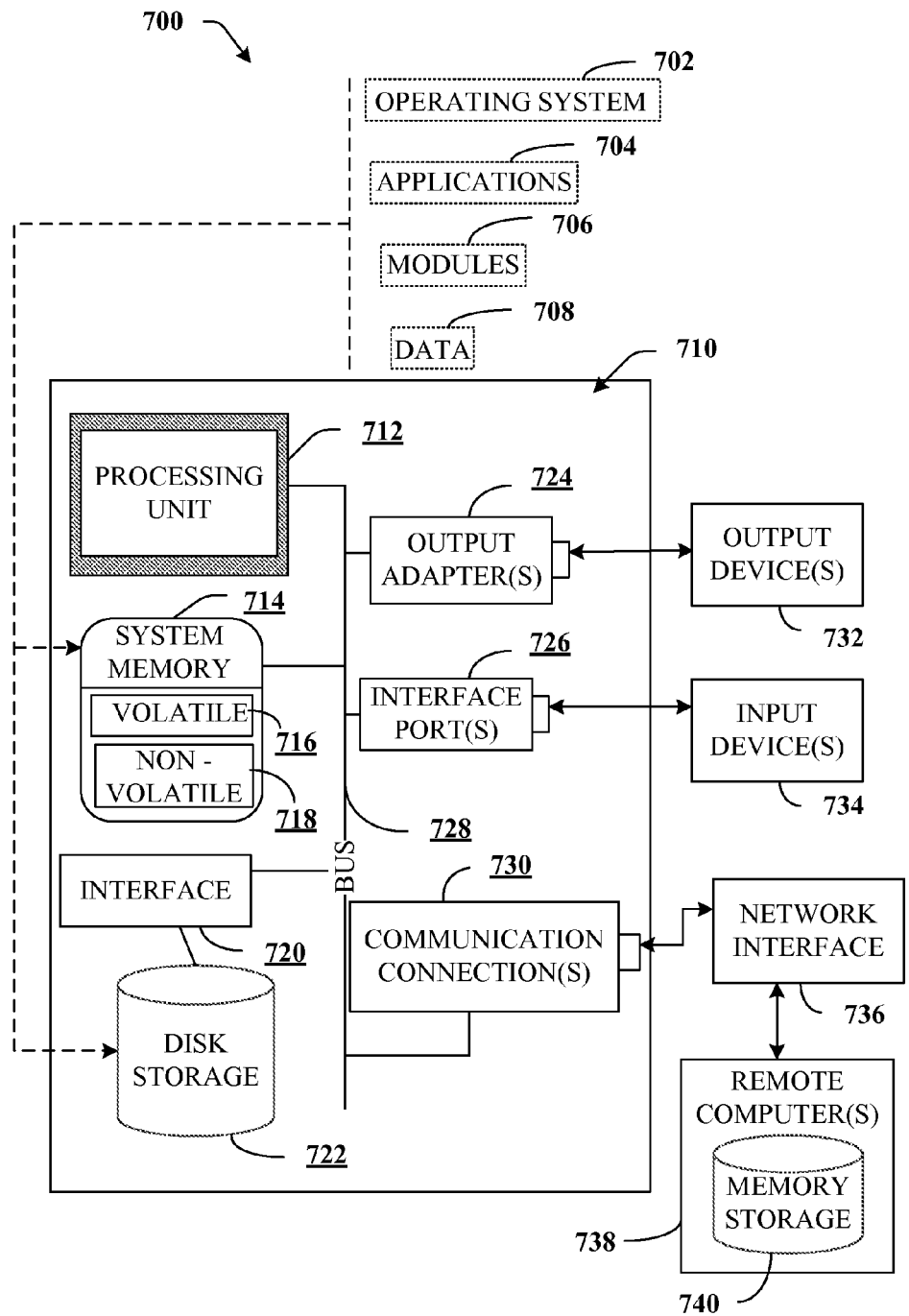
FIG. 7 is an exemplary environment for implementing various aspect of intelligent image summarization.

To provide additional context for various aspects of the present disclosure, FIG. 7 and the following discussion are intended to provide a brief, general description of a suitable operating environment 700 in which various aspects of the present disclosure may be implemented. While the summarization of images is described in the general context of computer-executable instructions, such as program modules, executed by one or more computers or other devices, those skilled in the art will recognize that the summarization of images can also be implemented in combination with other program modules and/or as a combination of hardware and software.

Generally, however, program modules include routines, programs, objects, components, data structures, etc. that perform particular tasks or implement particular data types. The operating environment 700 is only one example of a suitable operating environment and is not intended to suggest any limitations as to the scope of use or functionality of the present disclosure. Other well known computer systems, environments, and/or configurations that may be suitable and may include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 7, an exemplary environment 700 for implementing various aspects of the instant disclosure includes a computer 710. The computer 710 includes a processing unit 712, a system memory 714, and a system bus 728. The system bus 728 couples system components including, but not limited to, the system memory 714 to the processing unit 712. The processing unit 712 can be any of various available processors. Dual microprocessors and other multi-processor architectures also can be employed as the processing unit.

The system bus 712 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface.

The system memory 714 includes volatile memory 716 and nonvolatile memory 718. The basic input/output system (BIOS), containing the basic routines to transfer information between elements within the computer 710, such as during start-up, is stored in nonvolatile memory 718. By way of illustration, and not limitation, nonvolatile memory 718 can include read only memory (ROM), programmable ROM (PROM), electrically programmable ROM (EPROM), electrically erasable ROM (EEPROM), or flash memory. Volatile memory 716 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 710 also includes removable/nonremovable, volatile/nonvolatile computer storage media. FIG. 7 illustrates, for example a disk storage 722. Disk storage 722 includes, but is not limited to, devices like a magnetic disk drive, floppy disk drive, tape drive, Jaz drive, Zip drive, LS-110 drive, flash memory card, or memory stick. In addition, disk storage 722 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 722 to the system bus 712, a removable or non-removable interface is typically used such as interface 726.

It is to be appreciated that FIG. 7 describes software that acts as an intermediary between users and the basic computer resources described in suitable operating environment 700. Such software includes an operating system 702. Operating system 702, which can be stored on disk storage 722, acts to control and allocate resources of the computer system 710. System applications 704 take advantage of the management of resources by operating system 702 through program modules 706 and program data 708 stored either in system memory 714 or on disk storage 722. It is to be appreciated that the present disclosure can be implemented with various operating systems or combinations of operating systems.

A user enters commands or information into the computer 710 through input device(s) 734. Input devices 734 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 712 through the system bus 728 via interface port(s) 726. Interface port(s) 726 include, for example, a serial port, a parallel port, a game port, and a universal serial bus (USB). Output device(s) 732 use some of the same type of ports as input device(s) 734. Thus, for example, a USB port may be used to provide input to computer 710, and to output information from computer 710 to an output device 732. Output adapter 724 is provided to illustrate that there are some output devices 732 like monitors, speakers, and printers among other output devices 732 that require special adapters. The output adapters 724 include, by way of illustration and not limitation, video and sound cards that provide a means of connection between the output device 732 and the system bus 728. It should be noted that other devices and/or systems of devices provide both input and output capabilities such as remote computer(s) 738.

Computer 710 can operate in a networked environment using logical connections to one or more remote computers, such as remote computer(s) 738. The remote computer(s) 738 can be a personal computer, a server, a router, a network PC, a workstation, a microprocessor based appliance, a peer device or other common network node and the like, and typically includes many or all of the elements described relative to computer 710. For purposes of brevity, only a memory storage device 740 is illustrated with remote computer(s) 738. Remote computer(s) 738 is logically connected to computer 710 through a network interface 736 and then physically connected via communication connection 730. Network interface 736 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 730 refers to the hardware/software employed to connect the network interface 736 to the bus 728. While communication connection 730 is shown for illustrative clarity inside computer 710, it can also be external to computer 710. The hardware/software necessary for connection to the network interface 736 includes, for exemplary purposes only, internal and external technologies such as, modems including regular telephone grade modems, cable modems and DSL modems, ISDN adapters, and Ethernet cards.

Conclusion

The above-described techniques pertain to intelligently summarizing images search results and browsing. Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method comprising:
   receiving a plurality of images, each of the images having at least one visual attribute;
   determining a local scaling parameter for the plurality of images by evaluating similarities between one of the plurality of images and other images of the plurality of images based in part on the at least one visual attribute;
   calculating at least one preference score for the plurality of images, the at least one preference scores indicating a probability for an associated image of the plurality of images to be selected into a summary of the plurality of images;
   selecting a particular image of the plurality of images based on the similarity of the particular image to others of the plurality of images and a preference score of the at least one preference score associated with the particular image; and
   generating the summary of the plurality of images, the summary including the particular image.

2. The method of claim 1, wherein the local scaling parameter is given by:

$$\sigma_i^2 = \frac{n-1}{\sum_{k \neq i} \frac{1}{\max(\epsilon, d^2(x_i, x_k))}}$$

wherein $\sigma$ is the scaling parameter to adjust visual similarity degree, n is a number of the images, $\epsilon = 0.00001$, $x_i$ is a first data point, $x_k$ is a second data point and d is a distance between $x_i$ and $x_k$.

3. The method of claim 1, wherein the at least one preference score comprise:
   a relevancy score, the relevancy score being based on sequence order of the images in the plurality of images; and
   an image quality score, the image quality score being based on visual quality of the plurality of images.

4. The method of claim 3, wherein the sequence order of the images corresponds to order from image search results.

5. The method of claim 3, wherein the visual quality being determined by one or more from the group consisting of color entropy, brightness, blur, block, dynamic range, intensity contrast, image width or image height.

6. The method of claim 1, wherein the selecting is in accordance with:

$$\tilde{t}_{jk}^{|G|} = \begin{cases} \frac{t_{jk}^{|G-1|}}{\exp(\rho \times t_{ji}^0 \times t_{ki}^0)}, & i \neq j, i \neq k \\ t_{jk}^{|G-1|}, & \text{otherwise} \end{cases}$$

wherein, i is an index of an item selected in the |G−1|-th iteration, G is a group of images, $t^0_{ji}$ and $t^0_{ki}$ are initial transition probabilities from items j and k to item i, $\rho$ is a parameter controlling a degree of adjustment of the transition probabilities, and $\tilde{t}_{jk}^{|G|}$ is the matrix of tuned transition probabilities.

7. The method of claim 1, wherein the visual attributes include one or more from the group comprising color, shape or texture.

8. The method of claim 1, further comprising:
   displaying the others of the plurality of images concurrently with the particular image;
   varying the display of the others of the plurality of images is varied as a function of strength of similarity between the visual attribute associated with the others of the plurality of images and the visual attribute associated with the particular image.

9. The method of claim 8, further comprising generating a local detailed map of an active image, the local detailed map comprising a large scale view of the active image and the others of the plurality of images similar to the active image.

10. The method of claim 8, further comprising, generating a browsing path of images of the plurality of images similar to the active image.

11. The method of claim 8, wherein the displaying is based on isometric feature mapping.

12. The method of claim 10, wherein the browsing path further comprises at least one child image and at least one text root.

13. A system comprising:

one or more processors;

receiving logic that receives a plurality of images, each of the images having at least one visual attribute;

one or more computer-readable media maintaining one or more modules executable by the one or more processors to:

evaluate similarities between the plurality of images based in part on the at least one visual attribute of the plurality of images;

calculate preference scores for the plurality of images, the preference scores indicating a probability for an image of the plurality of images to be selected into a summary of the plurality of images;

select a particular image form the plurality of images based on the similarity of the particular image to others of the plurality of images and the preference scores of the particular image;

adjusting the preference scores for the others of the plurality of the images based on the particular image; and generate the summary of the plurality of images, the summary including the particular image.

14. The system of claim 13, wherein the one or more modules comprise:

a relevancy engine that provides a relevancy score based on sequence order of the images in the plurality of images; and an image quality engine that provides an image score based on visual quality of the plurality of images.

15. The system of claim 14, wherein the sequence order of the plurality of images correspond to an order of the plurality of images received from an image search.

16. The system of claim 13, further comprising:

a display module that displays the others of the plurality of images concurrently with the particular image, wherein the display of the others of the plurality of images is varied as a function of strength of similarity between the visual attribute associated with the others of the plurality of images and the visual attribute associated with the particular image.

17. The system of claim 16, wherein the display module further comprises a local detailed map engine that generates a local detailed map of an active image, the local detailed map comprises a large scale view of the active image and at least one of the plurality of images similar to the active image.

18. The system of claim 16, wherein the display module further comprises a browsing path engine that generates a browsing path of images of the plurality of images similar to the active image.

19. The system of claim 14, wherein the image quality engine further comprises a support vector machine.

20. A computer readable storage device comprising instructions that when executed by one or more processors, cause the one or more processors to:

receive a plurality of images, each of the images having at least one visual attribute;

compare the plurality of images to determine a preference score for an associated image of the plurality of images, the preference score comprising:

a probability score based on a probability for the associated image of the plurality of images to be selected into a summary image;

a relevancy score based on sequence order of the associated image in the plurality of images; and an image score based on visual quality of the associated image;

select the associated image of the plurality of images based in part on probability score, the relevancy score and the image score;

generate the summary image, the summary image including the selected image; and provide the summary image to a display.

* * * * *